(12) United States Patent
Osawa et al.

(10) Patent No.: US 7,320,566 B2
(45) Date of Patent: Jan. 22, 2008

(54) CUTTING TOOL INCLUDING DETACHABLE CUTTER HEAD

(75) Inventors: Jiro Osawa, Aichi (JP); Katsutoshi Watanabe, Aichi (JP); Tamotsu Nagai, Aichi (JP)

(73) Assignee: OSG Corporation, Aichi (JP)

( * ) Notice: Subject to any disclaimer, the term of this patent is extended or adjusted under 35 U.S.C. 154(b) by 182 days.

(21) Appl. No.: 11/342,482

(22) Filed: Jan. 30, 2006

(65) Prior Publication Data

US 2007/0031203 A1 Feb. 8, 2007

(30) Foreign Application Priority Data

Aug. 4, 2005 (JP) ............... 2005-226742

(51) Int. Cl.
*B23B 51/02* (2006.01)

(52) U.S. Cl. ............... 408/231; 408/226; 408/713

(58) Field of Classification Search ............... 408/144, 408/226, 231–233, 713, 227, 230; *B23B 51/02*
See application file for complete search history.

(56) References Cited

U.S. PATENT DOCUMENTS

| 748,890 | A | * | 1/1904 | Taylor et al. | ............... | 408/224 |
| 1,413,280 | A | * | 4/1922 | Kengel | ............... | 279/76 |
| 2,158,120 | A | * | 5/1939 | Hirschberg | ............... | 175/417 |
| 3,304,816 | A | * | 2/1967 | Galorneau | ............... | 408/226 |
| 5,971,673 | A | * | 10/1999 | Berglund et al. | ............... | 408/1 R |
| 6,276,879 | B1 | * | 8/2001 | Hecht | ............... | 409/234 |
| 6,582,164 | B1 | * | 6/2003 | McCormick | ............... | 408/226 |
| 7,070,367 | B2 | * | 7/2006 | Krenzer | ............... | 408/226 |
| 2006/0127194 | A1 | * | 6/2006 | Schafer | ............... | 408/231 |

FOREIGN PATENT DOCUMENTS

| JP | 01097512 A | * | 4/1989 |
| JP | 7-171702 | | 7/1995 |
| JP | 2000-176723 | | 6/2000 |
| JP | 2001-505136 | | 4/2001 |
| JP | 2002-103130 | | 4/2002 |
| JP | 2005118940 A | * | 5/2005 |
| SU | 1696174 A1 | * | 12/1991 |

* cited by examiner

*Primary Examiner*—Daniel W. Howell
(74) *Attorney, Agent, or Firm*—Muramatsu & Associates

(57) ABSTRACT

A cutting tool including a cutter head and a holder. One of the cutter head and the holder has a recess formed in its axial end portion and defined by its circumferential wall. The other of the cutter head and the holder has a protrusion formed in its axial end portion, such that the cutter head and the holder are detachably attached to each other, with the protrusion being introduced in the recess by an axial distance. The above-described one has coaxial holes formed in the circumferential wall. The above-described other has an engaging surface which is recessed from an outer circumferential surface of the protrusion and which is held in engagement with a pin that is received in the coaxial holes. Each of the coaxial holes has an axis which is inclined, with respect to a plane perpendicular to an axis of the above-described one, in a direction causing the above-described axial distance to be increased by a cutting resistance generated in a cutting operation.

8 Claims, 5 Drawing Sheets

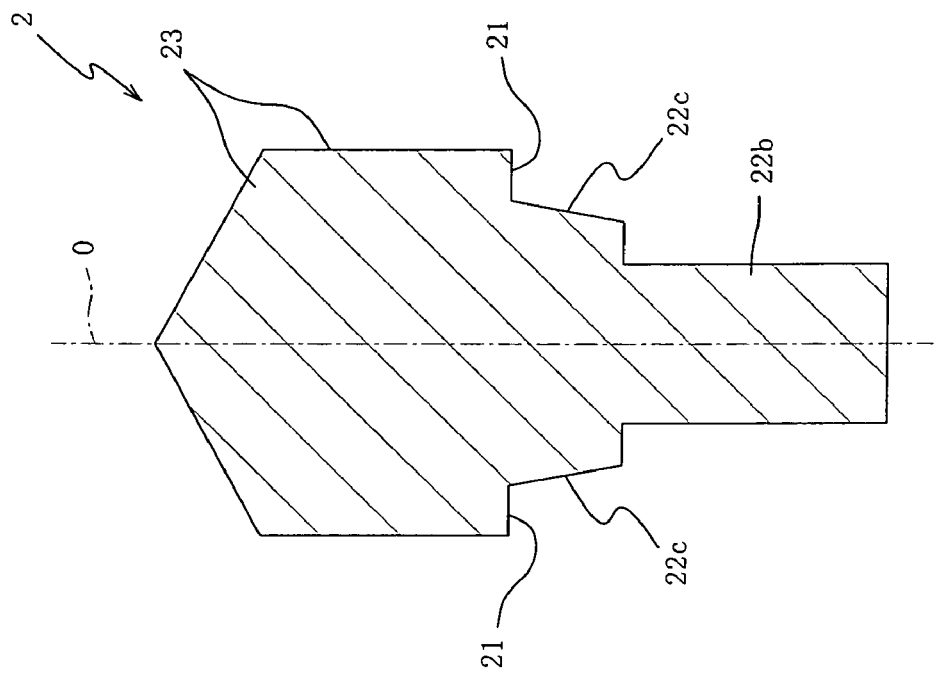
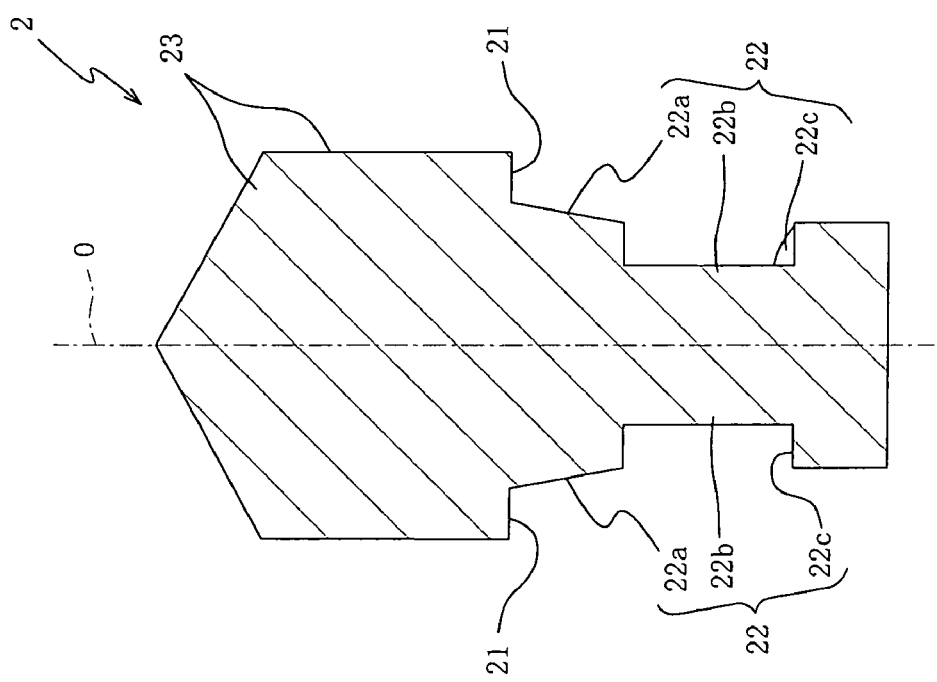

CUTTING TOOL INCLUDING DETACHABLE CUTTER HEAD

BACKGROUND OF THE INVENTION

1. Field of the Invention

The present invention relates in general to a cutting tool, and more particularly to such a cutting tool including a cutter head and a holder that are detachably attached to each other.

2. Discussion of the Related Art

There are known cutting tools each of which is to be used for cutting a workpiece in an operation performed by a machine tool such as a machining center. In recent years, many of such cutting tools are formed of cemented carbide, for the purpose of increasing its machining efficiency and tool life. However, since the cemented carbide is a material expensive and hard to be machined, there is a problem that a product cost of an entirety of the cutting tool is inevitably increased due to increases in material and machining costs, particularly, where the cutting tool is of a so-called solid type in which a main body and a shank (holder) are provided by a single piece that is formed of the cemented carbide.

In view of this, there is proposed a cutting tool including a cutter head as the main body and a holder to which the cutter head is detachably attached. In the proposed cutting tool, the cutter head is formed of cemented carbide while the holder is formed of other material, so that the increase in the product cost of the entirety of the cutting tool can be restrained. In such a cutting tool, the cutter head is attached to the holder as described below.

JP-H07-171702A (publication of unexamined Japanese Patent Application laid open in 1995) discloses a cutting tool in which a cutting insert as the cutter head is fixed to the holder. Specifically described, the cutting insert is fitted at its supported portion in a recess that is formed in a distal end portion of the holder, and a screw fastener is provided to pass through a through-hole formed through the supported portion of the cutting insert and be tightly screwed into an internally threaded hole formed in a bottom of the recess of the distal end portion of the holder. That is, the cutting insert can be firmly fixed to the distal end portion of the holder owing to thread engagement established by the screw fastener. In this arrangement in which the cutting insert is detachably attached to the holder only by the thread engagement, the cutting insert can be easily replaced with a new one, for example, when the cutting insert is worn out.

JP-2002-103130A (publication of unexamined Japanese Patent Application laid open in 2002) discloses a cutting tool in which the cutter head is attached to the holder by thread engagement. Specifically described, the cutter head has a protrusion formed in its axial end portion, while the holder has a recess formed in its axial end portion. The protrusion of the cutter head has an external thread formed in its outer surface, and the recess has an internal thread formed in its inner surface, so that the cutter head is tightly screwed into the holder. That is, the cutter head can be firmly fixed at its protrusion in the recess of the holder owing to the thread engagement. In this arrangement in which the cutter head is detachably attached to the holder by the thread engagement, the cutter head can be easily changed to a new one, as needed, without changing the holder.

JP-2001-505136A (publication of unexamined Japanese Patent Application laid open in 2001) discloses a cutting tool in which the cutter head and a shank as the holder are attached to each other through a retainer interposed therebetween. Specifically described, the cutter head and the retainer have respective hook-shaped engaging portions, so that the cutter head is held in engagement at its engaging portion with the engaging portion of the retainer that is fitted in a hole of the shank. Thus, the cutter head is firmly fixed relative to the shank. In this arrangement, too, the cutter head can be changed to a new one, as needed, without changing the shank.

JP-2000-176723A (publication of unexamined Japanese Patent Application laid open in 2000) discloses a cutting tool in which the cutter head is attached to a shank as the holder, by means of shrinkage fitting. Specifically described, the cutter head has an axial protrusion while the shank has a recess or hole, such that the axial protrusion of the cutter head can be fitted into the hole of the shank, with the shank being heated. The cutter head is firmly fixed to the shank, since the diameter of the hole of the shank is reduced when the temperature of the shank is eventually returned to an ordinary temperature causing the shank to shrink. In this arrangement, the cutter head can be replaced with a new one, as needed, by heating the shank.

However, in each of the cutting tools disclosed in JP-H07-171702A and JP-2002-103130A in which the cutter head is attached to the holder by the thread engagement, external and internal threads could be damaged due to a cutting resistance exerted to the threads. Thus, the cutting tool is likely to suffer a problem that the firm fixation of the cutter head to the holder could be easily lost.

Further, in the cutting tool disclosed in JP-2001-505136A in which the retainer has to be interposed between the cutter head and the shank, the number of components of the cutting tool is increased whereby cost required for the components is problematically increased.

Further, in JP-2000-176723A, since the shank has to be heated each time the cutter head is attached to or removed from the shank, the cutting tool requires a heating device used to heat the shank, leading to the consequent increase in installation cost.

SUMMARY OF THE INVENTION

The present invention was made in view of the background prior art discussed above. It is therefore an object of the present invention to provide a cutting tool which includes a cutter head and a holder that are detachably attached to each other, and which has an arrangement enabling the cutter head to be firmly fixed to the holder and also leading to reduction in cost required for manufacturing the cutting tool. This object may be achieved according to any one of first through eighth aspects of the invention which are described below.

The first aspect of this invention provides a cutting tool that is to be rotated relative to a workpiece, for performing a cutting operation, the cutting tool including: a cutter head; and a holder holding the cutter head, wherein one of the cutter head and the holder has a recess formed in an axial end portion thereof and defined by a circumferential wall thereof, wherein the other of the cutter head and the holder has a protrusion formed in an axial end portion thereof, such that the cutter head and the holder are detachably attached to each other, with the protrusion being introduced in the recess by an axial distance, wherein the one of the cutter head and the holder has a pair of coaxial holes in the form of first and second pin receiver holes which are formed in the circumferential wall and which are coaxial with each other, wherein the other of the cutter head and the holder has an engaging surface which is recessed from an outer circumferential surface of the protrusion and which is held in engagement with a pin that is received in the first and second pin receiver holes, and wherein each of the first and second pin receiver holes has an axis which is inclined, with respect to a plane that is perpendicular to an axis of the one of the cutter head and the holder, in a direction causing the above-described axial distance to be increased by a cutting resistance generated in the cutting operation.

According to the second aspect of the invention, in the cutting tool defined in the first aspect of the invention, the one of the cutter head and the holder is provided by the holder, while the other of the cutter head and the holder is provided by the cutter head.

According to the third aspect of the invention, in the cutting tool defined in the first or second aspect of the invention, each of the first and second pin receiver holes has a front portion and a rear portion that is located on a rear side of the front portion as viewed in a rotating direction in which the cutting tool is to be rotated in the cutting operation, wherein the rear portion is more distant than the front portion, from the other of the cutter head and the holder as viewed in an axial direction of the cutting tool.

According to the fourth aspect of the invention, in the cutting tool defined in any one of the first through third aspects of the invention, the first pin receiver hole is located on a rear side of the second pin receiver hole as viewed in a rotating direction in which the cutting tool is to be rotated in the cutting operation, wherein the first pin receiver hole is more distant than the second pin receiver hole, from the other of the cutter head and the holder as viewed in an axial direction of the cutting tool.

According to the fifth aspect of the invention, in the cutting tool defined in any one of the first through fourth aspects of the invention, the protrusion has a tapered outer surface that is inclined with respect to an axis of the protrusion, wherein the recess has a tapered inner surface whose taper angle corresponds to that of the tapered outer surface, so that the protrusion and the recess are fitted at the respective tapered outer and inner surfaces.

According to the sixth aspect of the invention, in the cutting tool defined in any one of the first through fifth aspects of the invention, the first and second pin receiver holes as the pair of coaxial holes are positioned relative to the circumferential wall, such that the pin received in the first and second pin receiver holes has an axially intermediate portion which is located between the first and second pin receiver holes and which is at least partially embedded in the circumferential wall.

According to the seventh aspect of the invention, in the cutting tool defined in any one of the first through sixth aspects of the invention, the protrusion includes an arc-shaped flange portion which projects outwardly in a radial direction of the protrusion, wherein the engaging surface is provided by the arc-shaped flange portion, and has a radially outer end radially distant from an axis of the protrusion by a distance that is substantially half of an inside diameter of the recess.

According to the eighth aspect of the invention, in the cutting tool defined in any one of the first through seventh aspects of the invention, the one of the cutter head and the holder has, in addition to the pair of coaxial holes, at least one pair of coaxial hole, such that the plurality of pairs of coaxial holes are equally spaced apart from each other in a circumferential direction of the one of the cutter head and the holder.

In the cutting tool constructed according to the present invention, since the axis of each of the first and second pin receiver holes is inclined, with respect to the plane perpendicular to the axis of the above-described one of the cutter head and the holder, in such a direction that increases the axial distance by which the protrusion is introduced in the recess, owing to a cutting resistance generated in the cutting operation, namely, in such a direction that forces the protrusion to be further introduced into the recess. This arrangement is effective to enable the cutter head and the holder to be firmly fixed to each other, with a sufficiently large strength with which the engaging surface is held in engagement with the pin. It is noted that the term "cutting resistance" used in the present specification is interpreted to principally mean, unless otherwise specified, a component of the cutting resistance or force exerted by the workpiece (that is being cut by the cutting tool), which component acts on the cutting tool in a direction opposite to the rotating direction of the cutting tool relative to the workpiece.

Further, since the cutter head and the holder are detachably attached to each other, the cutter head can be changed to a new one without changing the holder, for example, where the cutter head is worn out. By thus eliminating necessity of changing an entirety of the cutting tool, it is possible to reduce a tooling cost.

Further, since the cutter head and the holder can be made of respective different materials, only the cutter head can be made of cemented carbide. It is therefore possible to reduce a material cost and a machining cost, as compared with a solid-type cemented carbide tool in which the cutting tool is formed in its entirety with cemented carbide.

The pin received or fitted in the first and second pin receiving holes is subjected to a load during the cutting operation, and is replaceable with a new one when being damaged. This arrangement eliminates a necessity of replacing an entirety of the cutter head or the holder with a new one, leading to reduction in the material cost.

The above-described one of the cutter head and the holder requires, as arrangement for attaching it to the above-described other of the cutter head and the holder, only the first and second pin receiver holes and the pin received or fitted in the pin receiver holes. Thus, the above-described one can be manufactured at a reduced cost.

In the cutting tool according to the fifth aspect of the invention, in which the protrusion and the recess are fitted at the respective tapered outer and inner surfaces, the cutter head and the holder can be held in contact with each other over a sufficiently large contact area, so as to be further firmly fixed to each other. Further, the taper fitting arrangement facilitates establishment of a coaxial relationship between the cutter head and the holder.

In the cutting tool according to the sixth aspect of the invention, the first and second pin receiver holes are positioned relative to the circumferential wall of the above-described one of the cutter head and the holder, such that the axially intermediate portion of the pin is at least partially embedded in the circumferential wall, namely, such that at least a portion of an outer circumferential surface of the pin is embedded in the circumferential wall. This arrangement enables the pin to have a required degree of strength, thereby restraining the pin from being damaged due to a cutting resistance acting on the cutting tool, and minimizing risk of removal of the cutter head from the holder.

In the cutting tool according to the seventh aspect of the invention, the engaging surface (held in engagement with the pin) is provided by the arc-shaped flange portion projecting outwardly in the radial direction, and the radially outer end of the engaging surface is distant from the axis by the distance that is substantially half of the inside diameter of the recess. This arrangement enables the engaging surface to be engaged over its sufficiently large area with the pin, making it possible to further firmly attach the cutter head and the holder to each other.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which:

FIG. 3A is a cross sectional view of the cutter head, taken along line 3A-3A in FIG. 2A;

FIG. 3B is a cross sectional view of the cutter head, taken along line 3B-3B in FIG. 2A;

DETAILED DESCRIPTION OF THE PREFERRED EMBODIMENT

Figure 1:
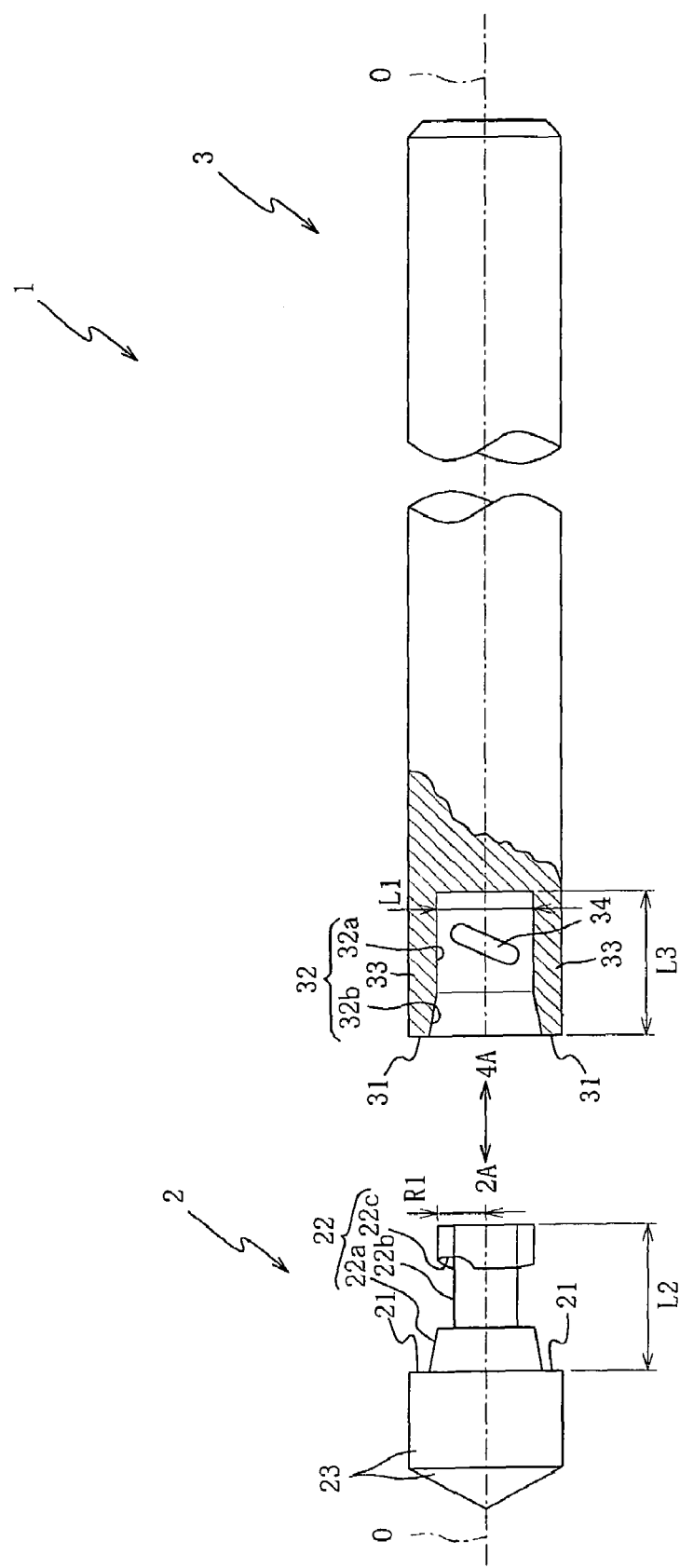
FIG. 1 is an exploded view of a cutting tool constructed according to an embodiment of the invention.

There will be described a cutting tool 1 constructed according to an embodiment of the invention, with reference to the accompanying drawings. FIG. 1 is an exploded view of the cutting tool 1 including a cutter head 2 and a cutter head holder 3. In FIG. 1, one of axially opposite end portions of the cutter head holder 3 (a left end portion of the cutter head holder 3 as seen in FIG. 1) is shown in its cross section, and an axially intermediate portion of the cutter head holder 3 is not illustrated. The cutting tool 1 is attached to a spindle of a machine tool (such as a milling or drilling machine with or without a numerical control system), through a suitable tool holder (not shown) that is attached to the spindle, so that a rotary motion of the spindle is transmitted to the cutting tool 1 via the tool holder, whereby a cutting operation is performed by the cutting tool 1.

In the present cutting tool 1, the cutter head 2 and the cutter head holder 3 are detachably attached to each other, so that the two elements 2, 3 can be formed of respective different materials. For example, while the cutter head 2 is formed of cemented carbide, the holder 3 may be formed of other material such as high-speed tool steel, thereby making possible to reduce a material cost and a machining cost. Further, the cutter head 2 can be changed to a new one without changing the holder 3, for example, where the cutter head 2 is worn. By thus eliminating necessity of changing an entirety of the cutting tool, it is possible to reduce a tooling cost, leading to an efficient use of limited resources.

The cutter head 2 includes a main portion in the form of a cutting blade portion 23 that is caused to cut a workpiece in the cutting operation, and an attached portion in the form of an axial protrusion 22 that is formed in an axially proximal end portion of the cutter head 2. The protrusion 22 axially protrudes from a rear end surface 21 of the cutting blade portion 23 (from a right end surface of the blade portion 23 as seen in FIG. 1), which surface is perpendicular to an axis of the cutter head 2.

The cutting blade portion 23 has: at least one flute formed in its outer circumferential surface and extending from its axially distal end toward its axially proximal end; at least one cutting edge each defined by an edge of a corresponding one of the at least one chip evacuation flute; and at least one flank surface each located on a rear side of a corresponding one of the at least one cutting edge as viewed in a rotating direction of the cutting tool 1, although the flute, cutting edge and flank surface are not illustrated in the accompanying drawings in which the cutting blade portion 23 is schematically presented. It is noted that, while the cutter head 2 is provided by a drill, the cutter head 2 may be provided by other type of cutter such as end mill, face mill, reamer, boring bar, thread-milling cutter and thread-forming tap.

The protrusion 22 of the cutter head 2 is fittable into an axial hole or recess 32 that is formed in an axially distal end portion (front end portion) of the cutter head holder 3. The protrusion 22 has a tapered outer surface 22a that is axially contiguous to the rear end surface 21, a straight or non-tapered outer surface 22b that is axially contiguous to the tapered outer surface 22a, and an engaging surface 22c that extends from the non-tapered outer surface 22b outwardly in a radial direction of the protrusion 22 (in a vertical direction as seen in FIG. 1). The tapered outer surface 22a is provided by a tapered portion of the protrusion 22 having an outside diameter gradually reduced as viewed in a direction toward a rear end portion of the protrusion 22 (as viewed in a rightward direction as seen in FIG. 1). The non-tapered outer surface 22b is provided by a non-tapered portion of the protrusion 22 having an outside diameter that is smaller than the outside diameter of the portion providing the tapered outer surface 22a.

The tapered outer surface 22a has a taper angle (taper ratio) corresponding to that of a tapered inner surface 32b of the recess 32 of the cutter head holder 3. It is noted that the taper angle of the tapered outer and inner surfaces 22a, 32b is not smaller than 1/20 and is not larger than 1/5.

The non-tapered portion of the protrusion 22 is axially contiguous to the tapered portion of the protrusion 22, and the outside diameter of the non-tapered portion is smaller than an inside diameter L1 of a non-tapered portion of the recess 32 of the holder 3.

The protrusion 22 includes a pair of arc-shaped flange portions each projecting outwardly in its radial direction (in the vertical direction as seen in FIG. 1). The engaging surface 22c is provided by one of axially opposite end surfaces of each of the arc-shaped flange portions which faces toward the cutting blade portion 23 (i.e., a left one of the axially opposite end surfaces of each arc-shaped flange portion as seen in FIG. 1). That is, the engaging surface 22c is recessed from an outer circumferential surface of the protrusion 22. The engaging surface 22c has a radially outer end that is radially distant from an axis of the protrusion 22 by a distance R1. This distance R1 (i.e., a radius R1 of the arc-shaped flange portion) is about half of the inside diameter L1 of the non-tapered portion of the recess 32.

The cutter head holder 3 has an axially distal end surface 31, and an outer circumferential wall 33 located in its axially distal end portion. The above-described recess 32 is formed in the axially distal end surface 31 so as to extend by a predetermined axial distance, and is defined or surrounded by the outer circumferential wall 33. The holder 3 has two pairs of coaxial holes each provided by first and second pin receiver holes 35, 36 that are formed in the outer circumferential wall 33. Two pins 34 are provided to be press-fitted in the respective two pairs of coaxial holes (see FIGS. 4A and 4B).

While the cutter head holder 3 is formed of high-speed tool steel in the present embodiment, the holder 3 may be formed of other material such as cermet, CBN (cubic boron nitrides) sintered body, powder high-speed steel (sintered high-speed tool steel) and alloy tool steel. However, the holder 3 is preferably formed of a material which is softer than a material forming the cutter head 2. For example, where the cutter head 2 is formed of cemented carbide, the holder 3 is preferably formed of high-speed tool steel. Where the cutter head 2 is formed of high-speed tool steel, the holder 3 is preferably formed of cermet. Owing to such a material selection, the holder 3 is given a higher degree of deformability than the cutter head 2. Thus, the holder 3 is deformable upon fitting of the protrusion 22 into the recess 32, thereby eliminating necessity of machining the holder 3 with an extremely high precision, and leading to the consequent reduction in manufacturing cost.

The recess 32 of the holder 3 serves as an attached portion at which the holder 3 is attached to the cutter head 2, and has the above-described tapered inner surface 32b and a straight or non-tapered surface 32a that is substantially parallel to an axis of the holder 3 (i.e., an axis O of the cutting tool 1). The tapered inner surface 32b, which is axially contiguous to the non-tapered surface 32a, is provided by a tapered portion of the recess 32 having an inside diameter gradually increased as viewed in a direction toward an opening of the recess 32 (as viewed in a leftward direction as seen in FIG. 1). An axial depth L3 of the recess 32 (i.e., an axial distance L3 between the opening and bottom of the recess 32) is larger than an axial distance L2 between the axially proximal and distal ends of the protrusion 22.

The inside diameter L1 of the non-tapered portion of the recess 32 providing the non-tapered surface 32a is about twice as large as the above-described distance R1 by which the radially outer end of the engaging surface 22c is radially distant from the axis of the protrusion 22. The taper angle (taper ratio) of the tapered inner surface 32b corresponds to that of the tapered outer surface 22a, and is not smaller than 1/20 and is not larger than 1/5. The outer circumferential wall 33 defining a periphery of the recess 32 has the two pairs of coaxial holes each provided by the first and second pin receiver holes 35, 36.

Each of the pins 34 is provided by a generally cylindrical member (straight pin) having an outside diameter that is substantially equal to an inside diameter of the coaxial holes (first and second receiver holes 35, 36), and is press-fitted in a corresponding one of the two pairs of coaxial holes. Each of the pins 34 has an axially intermediate portion which is located between the first and second pin receiver holes 35, 36 as the corresponding pair of coaxial holes and which includes a part projecting inwardly from an inner circumferential surface of the outer circumferential wall 33 (see FIG. 4A), so that the inwardly projecting part of the axially intermediate portion of the pin 34 is held in engagement with the engaging surface 22c of the protrusion 22.

While the pins 34 are formed of high-speed tool steel in the present embodiment, they may be formed of other material such as cemented carbide. Where the pins 34 are formed of high-speed tool steel, the pins 34 exhibit a higher degree of deformability than where they are formed of cemented carbide, so that the pins 34 can be more easily press-fitted into the first and second pin receiver holes 35, 36, thereby facilitating an operation to attach the cutter head 2 to the holder 3. Where the pins 34 are formed of cemented carbide, on the other hand, the pins 34 exhibit a higher degree of hardness than where they are formed of high-speed tool steel, so that the pins 34 are prevented from being damaged due to their engagement with the respective engaging surfaces 22c, thereby leading to a prolonged tool life of the cutting tool 1 in its entirety.

In view of above, it is preferable that the pins 34 are formed of a suitable one of various materials that is selected depending upon conditions of the cutting operation, particularly, a degree of hardness of the workpiece that is to be machined in the cutting operation. For example, where the degree of hardness of the workpiece is high, the pins 34 are preferably formed of cemented carbide, for providing the pins 34 with a high durability even against a high cutting resistance generated in the cutting operation.

Figure 2A:
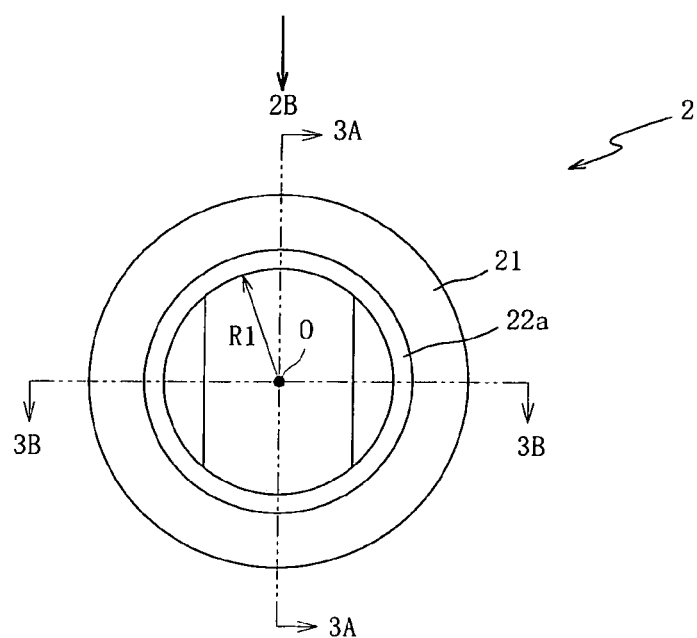
FIG. 2A is a view of a cutter head of the cutting tool of FIG. 1, as seen in a direction indicted by arrow 2A in FIG. 1.

Referring to FIGS. 2A, 2B, 3A and 3B, the cutter head 2 will be described more in detail. The protrusion 22 has, in its rear end portion, a part-cylindrical portion having a pair of substantially arcuate surfaces and a pair of flat surfaces substantially that are substantially parallel to each other, as shown in FIG. 2A. The pair of arcuate surfaces are diametrically opposed to each other, while the pair of flat surfaces are diametrically opposed to each other, so that the arcuate surfaces and the flat surfaces are alternately arranged as viewed in a circumferential direction of the protrusion 22. A distance between the pair of flat surfaces is substantially equal to the outside diameter of the non-tapered portion of the protrusion 22 that provides the non-tapered outer surface 22b (see FIG. 3B). Each of the pair of arcuate surfaces is provided by a corresponding one of the above-described pair of arc-shaped flange portions providing the engaging surface 22c. As shown in FIG. 3A, the engaging surface 22c is contiguous to the non-tapered outer surface 22b, and is located in each of positions that are diametrically opposed to each other. Each of the two diametrically opposed engaging surfaces 22c is inclined with respect to a plane perpendicular to the axis O by an angle θ1 (see FIG. 2B).

In the present embodiment, the cutter head 2 is provided by a drill head that is to be rotated in a clockwise direction (as seen in the direction indicated by arrow 2A in FIG. 1) as a predetermined rotating direction. Thus, the flute and leading edge formed in the cutting blade portion 23 of the cutter head 2 are provided by right-hand flute and leading edge, although not illustrated in the accompanying drawings.

Figure 2B:
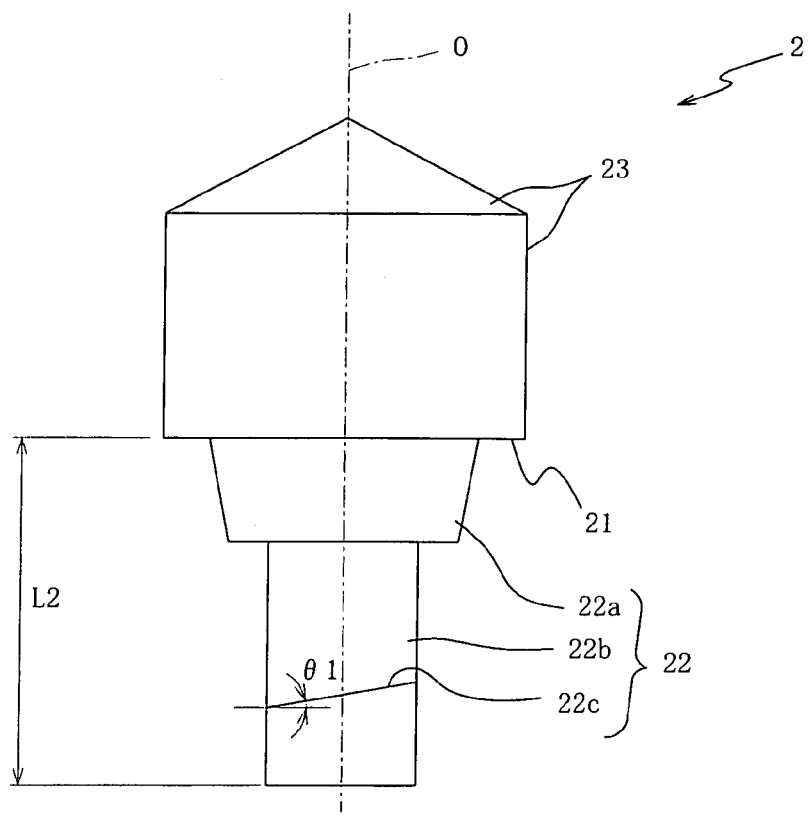
FIG. 2B is a view of the cutter head, as seen in a direction indicated by arrow 2B in FIG. 2A.

Each of the two diametrically opposed engaging surfaces 22c has a front portion (i.e., a right portion as seen in FIG. 2B) and a rear portion (i.e., a left portion as seen in FIG. 2B) that is located on a rear side of the front portion as viewed in the above-described rotating direction, such that the rear portion is more distant than the front portion, from the cutting blade portion 23 as viewed in the axial direction. This arrangement of the inclination of each of the engaging surfaces 22c with respect to the above-described plane is effective to cause the tapered outer and inner surfaces 22a, 32b of the respective protrusion 22 and recess 32 to be forced against each other by a cutting resistance generated in the cutting operation, namely, to cause the protrusion 22 to be forced by the cutting resistance to be further introduced into the recess 32, thereby enabling the cutter head 2 and the holder 3 to be further firmly fixed to each other, with the tapered outer and inner surfaces 22a, 32b being held in fitting engagement with a sufficiently large strength as well as with each of the engaging surfaces 22c and a corresponding one of the pins 34 being held in engagement with a sufficiently large strength.

Where the cutter head 2 is provided by a drill head which has a left-hand flute so as to be rotated in a counterclockwise direction as the rotating direction, too, each of the engaging surfaces 22c is inclined with respect to the above-described plane such that the rear portion of each engaging surface 22c is more distant than the front portion of each engaging surface 22c, from the cutting blade portion 23 as viewed in the axial direction. As in the case where the cutter head 2 is provided by the drill head with right-hand flute, this arrangement is effective to enable the cutter head 2 and the holder 3 to be further firmly fixed to each other, with the tapered outer and inner surfaces 22a, 32b being held in fitting engagement with a sufficiently large strength. It is noted that, while the front and rear portions of each engaging surface 22c are provided by the right and left portions of each engaging surface 22c, respectively, as seen in FIG. 2B in the case of the drill head with right-hand flute, the front and rear portions of each engaging surface 22c would be provided by the left and right portions of each engaging surface 22c, respectively, as seen in a figure corresponding to FIG. 2B in the case of the drill head with left-hand flute.

The above-described angle θ1 of the inclination of each engaging surface 22c with respect to the plane perpendicular to the axis O is preferably not smaller than 5° and not larger than 45°. If the inclination angle θ1 is smaller than 5°, there might be a risk that the cutting resistance would cause the cutter head 2 to be rotated relative to the holder 3. If the inclination angle θ1 is larger than 45°, on the other hand, a component of a force exerted by the pin 34 onto the engaging surface 22c, which component acts in the axial direction, might be too small to sufficiently force the protrusion 22 of the cutter head 2 to be further introduced into the recess 32 of the holder 3. Therefore, with the inclination angle θ1 being set to a value not smaller than 5° and not larger than 45°, it is possible to assure firm attachment of the cutter head 2 to the holder 3 while reliably preventing a rotation of the cutter head 2 relative to the holder 3.

Figure 4B:
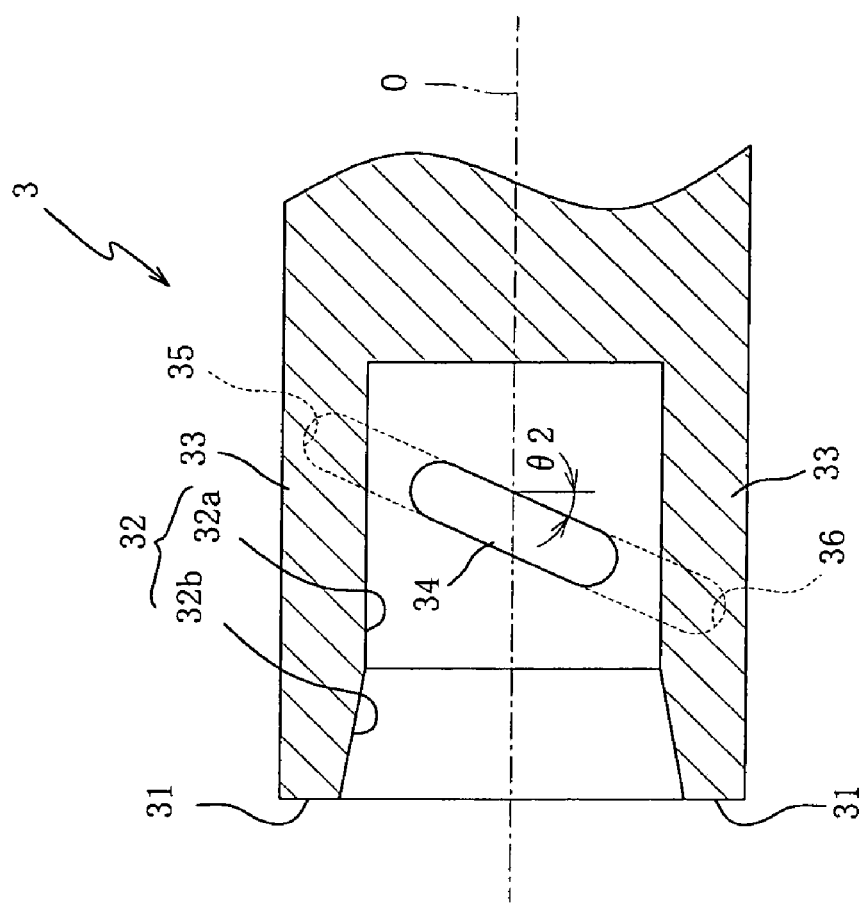
FIG. 4B is a cross sectional view of the cutter head holder, taken along line 4B-4B in FIG. 4A.
Figure 4A:
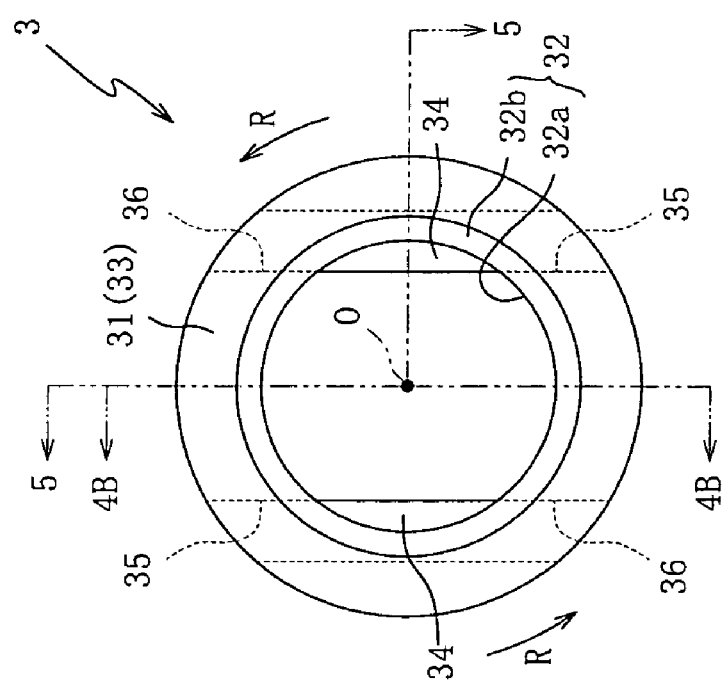
FIG. 4A is a view of a cutter head holder of the cutting tool of FIG. 1, as seen in a direction indicted by arrow 4A in FIG. 1.

Referring next to FIGS. 4A and 4B, the cutter head holder 3 will be described more in detail. Each of the first and second pin receiving holes 35, 36 is provided by a substantially circular-shaped hole having an inside diameter substantially equal to the outside diameter of the pin 34. The first pin receiver hole 35 is located on a rear side of the second receiver pin hole 36 as viewed in the rotating direction (indicated by arrows R in FIG. 4A). The first pin receiver holes 35 of the respective two pairs of coaxial holes are positioned to be symmetrical with each other with respect to the axis O, as shown in FIG. 4A. Similarly, the second pin receiver holes 36 of the respective two pairs of coaxial holes are positioned to be symmetrical with each other with respect to the axis O. That is, the two pairs of coaxial holes are symmetrical with each other with respect to the axis O, so as to be equally spaced apart from each other in a circumferential direction of the holder 3. Each of the two pins 34 is press-fitted in a corresponding one of the pairs of coaxial holes (first and second pin receiver holes 35, 36). The axially intermediate portion of each pin 34 located between the first and second pin receiver holes 35, 36 includes the part projecting inwardly from the inner circumferential surface of the outer circumferential wall 33 (see FIG. 4A), so that the inwardly projecting part of the axially intermediate portion of the pin 34 is held in engagement with the engaging surface 22c of the protrusion 22.

Each pin 34 received in the first and second pin receiving holes 35, 36 is subjected to a load in the cutting operation, and is replaceable with a new one when being damaged. This arrangement eliminates a necessity of replacing an entirety of the holder 3 with a new one, leading to reduction in the material cost.

The first and second pin receiver holes 35, 36 of each of the pairs of coaxial holes are positioned relative to the outer circumferential wall 33, such that a connecting hole connecting and coaxial to the first and second pin receiver holes 35, 36 is partially defined by the outer circumferential wall 33, namely, such that the axially intermediate portion of the pin 34 (located in the connecting hole between the first and second pin receiver holes 35, 36) is at least partially embedded in the outer circumferential wall 33. This arrangement enables the pin 34 to have a required degree of strength, thereby restraining the pin 34 from being damaged due to a cutting resistance acting on the cutting tool 1, leading to prolongation in life of the pin 34, and minimizing risk of removal of the cutter head 2 from the holder 3.

Further, the second pin receiver hole 36 is located to be closer than the first pin receiver hole 35, to the axially distal end of the holder 3 (i.e., left end of the holder 3 as seen in FIG. 4B) as viewed in the axial direction, as shown in FIG. 4B. Thus, the pin 34 fitted in the first and second receiver hole 34 is inclined such that a front portion of the pin 34 is closer than a rear portion of the pin 34 (located on a rear side of the front portion of the pin 34), to the axially distal end of the holder 3 as viewed in the axial direction. This arrangement of the inclination of the pin 34 is effective to cause the protrusion 22 to be forced by the cutting resistance to be further introduced into the recess 32, thereby enabling the cutter head 2 and the holder 3 to be further firmly fixed to each other, with the tapered outer and inner surfaces 22a, 32b being held in fitting engagement with a sufficiently large strength, as well as with the pin 34 and the engaging surface 22c being held in engagement with a sufficiently large strength.

Where the cutter head 2 is provided by a drill head which has a left-hand flute so as to be rotated in a counterclockwise direction as the rotating direction, too, the second pin receiver hole 36 is located to be closer than the first pin receiver hole 35 (located on the rear side of the second receiver hole 36 as viewed in the rotating direction), to the axially distal end of the holder 3 as viewed in the axial direction. As in the case where the cutter head 2 is provided by the drill head with right-hand flute, this arrangement is effective to enable the cutter head 2 and the holder 3 to be further firmly fixed to each other, with the tapered outer and inner surfaces 22a, 32b being held in fitting engagement with a sufficiently large strength.

An angle θ2 of the inclination of the pin 34 (the first and second pin receiver holes 35, 36) with respect to the plane perpendicular to the axis O is preferably substantially equal to the above-described inclination angle θ1 (see FIG. 2B). This preferable arrangement is effective to maximize an area over which the pin 34 and the engaging surface 22c are held in engagement with each other, thereby facilitating the cutter head 2 to be firmly fixed to the holder 3.

In the present embodiment, as described above, the number of pairs of coaxial holes (first and second pin receiver holes 35, 36) is two so that the two pins 34 are received in the respective two pairs of coaxial holes. However, the number of pair or pairs of coaxial holes may be one, three or more than three. Where the number of pairs of coaxial holes is two or more, the plurality of pairs of coaxial holes are equally spaced apart from each other in the circumferential direction.

Figure 5:
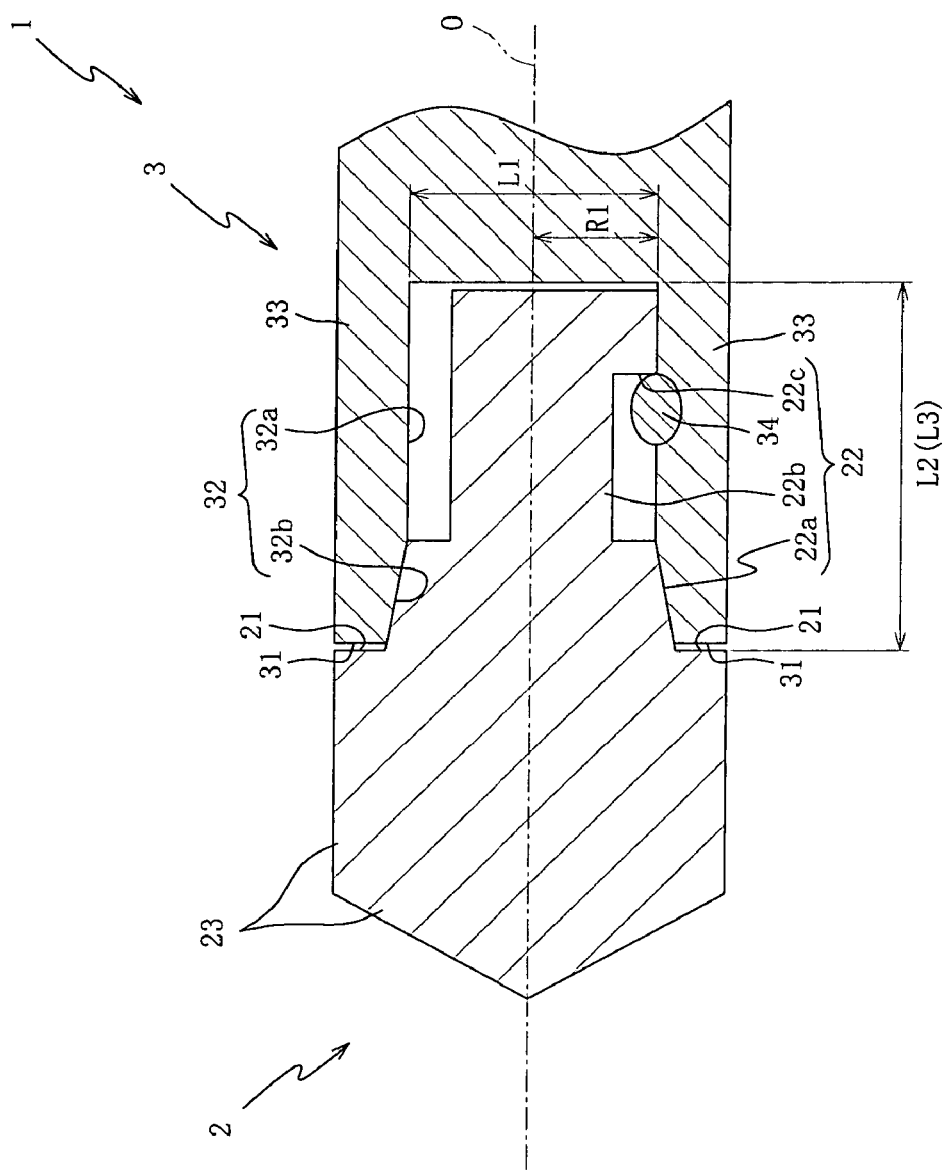
FIG. 5 is a cross sectional view of the cutter head holder taken along line 5-5 in FIG. 4A, together with the cutter head attached to the cutter head holder.

Referring next to FIG. 5, there will be described the attachment of the cutter head 2 and the cutter head holder 3 to each other. It is noted that, in FIG. 5, the holder 3 is not shown in its entirety but is shown only in its axially distal end portion.

As shown in FIG. 5, the protrusion 22 of the cutter head 2 is fitted in the recess 32 of the holder 3, with the tapered outer surface 22a of the cutter head 2 is held in close contact with the tapered inner surface 32b of the holder 3. Owing to this arrangement with the taper fitting, the cutter head 2 and the recess 32 can be held in mutual contact over a larger area, than in an arrangement in which the tapered outer and inner surfaces 22a, 32b are replaced with non-tapered surfaces substantially parallel to the axis O. That is, the taper fitting enables to the cutter head 2 and the holder 3 to be further firmly fixed to each other.

The taper angle (taper ratio) of the tapered outer and inner surfaces 22a, 32b is not smaller than 1/20 and is not larger than 1/5. If the taper angle is smaller than 1/20, a component of a force exerted by each one of the tapered outer and inner surfaces 22a, 32b onto the other of the surfaces 22a, 32b, which component acts in the axial direction, is made small, making it possible to reduce a risk of removal of the protrusion 22 from the recess 32. However, the extremely small taper angle requires an increase in the axial distance L2 between the axially proximal and distal ends of the protrusion 22, leading to increase in the material cost. If the taper angle is larger than 1/5, on the other hand, the required axial distance L2 of the protrusion 22 can be made small, leading to reduction in the material cost. However, the extremely large taper angle could increase a risk of removal of the protrusion 22 from the recess 32.

For the above reasons, with the taper angle being not smaller than 1/20 and being not larger than 1/5, it is possible to reduce the risk of removal of the protrusion 22 from the recess 32, and also to reduce the required material cost.

Further, the axial distance L3 between the opening and bottom of the recess 32 is larger than the axial distance L2 between the axially proximal and distal ends of the protrusion 22, as described above. This arrangement assures a spacing gap between the surfaces 21, 31 and a spacing gap between the distal end of the protrusion 22 and the bottom of the recess 32. Thus, even if the protrusion 22 is actually moved by the cutting resistance to be further introduced into the recess 32, the surfaces 21, 31 are not brought into contact with each other, and the distal end of the protrusion 22 and the bottom of the recess 32 are not brought into contact with each other, thereby eliminating a risk of separation of the tapered outer and inner surfaces 22a, 32b from each other. Since the risk of the separation of the tapered outer and inner surfaces 22a, 32b is thus eliminated, it is possible to maintain the firm fixation of the cutter head 2 to the cutter head holder 3.

Further, the radius R1 of the arc-shaped flange portion providing each engaging surface 22c is adapted to be about half of the inside diameter L1 of the non-tapered portion of the recess 32, as described above. This arrangement permits the arc-shaped flange portion to be held in contact at its radially outer end surface with the non-tapered inner surface 32a (i.e., with the non-tapered portion of the recess 32), enabling the engaging surface 22c to be engaged over its sufficiently large area with the pin 34, and accordingly making it possible to further firmly attach the cutter head 2 and the holder 3 to each other.

As is apparent from the above description, in the cutting tool 1 constructed according to the present embodiment, since the cutter head 2 is detachably attached to the cutter head holder 3 by the engagement of the pins 34 with the respective engaging surfaces 22c, the cost required for the components can be reduced by eliminating provision of an additional member between the cutter head 2 and the holder 3, which additional member has been required in a conventional cutting tool as disclosed in the above-mentioned JP-2001-505136A.

Further, the present cutting tool 1 does not require a heating device, which has been required in a conventional cutting tool as disclosed in the above-mentioned JP-2000-176723A, for heating the holder (shank) each time the cutter head is attached to or removed from the holder. The elimination of necessity of the heating device leads to reduction in the installation cost.

While the preferred embodiment of the present invention has been described above in detail for illustrative purpose only, it is to be understood that the invention is not limited to the above-described embodiments but may be otherwise embodied.

For example, in the above-described embodiment, each of the pins 34 is radially spaced apart from the non-tapered outer surface 22b of the protrusion 22, as shown in FIG. 5. However, each of the pins 34 may have an outside diameter that is determined such that the pin 34 is held in contact with the non-tapered outer surface 22b. In this modified arrangement, each pin 34 is held in contact at its two surfaces with the respective engaging surface 22c and non-tapered outer surface 22b, thereby making is possible to further firmly attach the cutter head 2 to the holder 3.

While each pin 34 is provided by the straight pin in the above-described embodiment, it may be provided by a tapered pin. Where each pin 34 is provided by the taper pin, the pin 34 can be further easily press-fitted and removed in and from the first and second pin receiver holes 35, 36, leading to an improvement in efficiency of the operation.

Further, each pin 34 and the first and second pin receiver holes 35, 36 may be fixed by thread engagement, for example, by forming an external thread in the outer circumferential surface of the pin 34 while forming an internal thread in the inner circumferential surfaces of each of the holes 35, 36. This arrangement facilitates the attachment of the pin 34 into the holes 35, 36, leading to an improvement in efficiency of the operation.

Further, an internally threaded hole (tapped hole) may be formed in an axial end surface of each pin 34, so that the pin 34 can be easily removed from the holes 35, 36, by using, for example, an extractor tool in the form of an externally threaded member, which is to be screwed into the internally threaded hole of the pin 34 and then pulled together with the pin 34.

Further, while each pin 34 has a substantially circular shape in its cross section in the above-described embodiment, it may have a substantially elliptic shape or polygonal shape in its cross section.

Further, in the above-described embodiment, each engaging surface 22c and each pair of coaxial holes (first and second pin receiver holes 35, 36) are both inclined with respect to the plane perpendicular to the axis O. However, this arrangement may be modified such that only one of each engaging surface 22c and each pair of coaxial holes is inclined while the other is not inclined. This modified arrangement leads to reduction in the manufacturing cost.

Further, in the above-described embodiment, the two pairs of coaxial holes (first and second pin receiver holes 35, 36) are the same in that the coaxial holes are inclined such that the rear portion of each of the coaxial holes is more distant than the front portion of each of the coaxial holes (that is located on a front side of the rear portion as viewed in the clockwise direction as the predetermined rotating direction), from the cutter head 2 as viewed in the axial direction. However, the two pairs of coaxial holes may be different from each other such that the rear portion is more distant than the front portion from the cutter head 2 in one of the two pairs of coaxial holes while the rear portion is closer than the front portion to the cutter head 2 in the other of the two pairs of coaxial holes. This modified arrangement enables the cutter head 2 to be firmly attached to the holder 3, irrespective of whether the cutting tool 1 is rotated in the clockwise direction or counterclockwise direction. That is, where the cutter head 2 is designed to be rotated in the clockwise direction in the cutting operation, the protrusion 22 of the cutter head 2 is forced by the cutting resistance to be further introduced into the recess 32 of the holder 3, as a result of the engagement of a corresponding one of the engaging surfaces 22 with the a corresponding one of the pins 34 received in the above-described one of the two pairs of coaxial holes. Where the cutter head 2 is designed to be rotated in the counterclockwise direction in the cutting operation, the protrusion 22 of the cutter head 2 is forced by the cutting resistance to be further introduced into the recess 32 of the holder 3, as a result of the engagement of the other of the engaging surfaces 22 with the other of the pins 34 received in the above-described other of the two pairs of coaxial holes. Therefore, the cutter head holder 3 with this modified arrangement can serve as a holder that is common to cutter heads such as drills having respective flutes that are twisted in different directions.

It is to be understood that the present invention may be embodied with various other changes, modifications and improvements, which may occur to those skilled in the art, without departing from the sprit and scope of the invention defined in the following claims.

What is claimed is:

1. A cutting tool that is to be rotated relative to a workpiece, for performing a cutting operation, said cutting tool comprising:
    a cutter head; and
    a holder holding said cutter head,
    wherein one of said cutter head and said holder has a recess formed in an axial end portion thereof and defined by a circumferential wall thereof,
    wherein the other of said cutter head and said holder has a protrusion formed in an axial end portion thereof, such that said cutter head and said holder are detachably attached to each other, with said protrusion being introduced in said recess by an axial distance,
    wherein said one of said cutter head and said holder has a pair of coaxial holes in the form of first and second pin receiver holes which are formed in said circumferential wall and which are coaxial with each other,
    wherein said other of said cutter head and said holder has an engaging surface which is recessed from an outer circumferential surface of said protrusion and which is held in engagement with a pin that is received in said first and second pin receiver holes,
    and wherein each of said first and second pin receiver holes has an axis which is inclined, with respect to a plane that is perpendicular to an axis of said one of said cutter head and said holder, in a direction causing said axial distance to be increased by a cutting resistance generated in the cutting operation.

2. The cutting tool according to claim 1, wherein said one of said cutter head and said holder is provided by said holder, while said other of said cutter head and said holder is provided by said cutter head.

3. The cutting tool according to claim 1,
    wherein each of said first and second pin receiver holes has a front portion and a rear portion that is located on a rear side of said front portion as viewed in a rotating direction in which said cutting tool is to be rotated in the cutting operation,
    and wherein said rear portion is more distant than said front portion, from said other of said cutter head and said holder as viewed in an axial direction of said cutting tool.

4. The cutting tool according to claim 1,
    wherein said first pin receiver hole is located on a rear side of said second pin receiver hole as viewed in a rotating direction in which said cutting tool is to be rotated in the cutting operation,
    and wherein said first pin receiver hole is more distant than said second pin receiver hole, from said other of said cutter head and said holder as viewed in an axial direction of said cutting tool.

5. The cutting tool according to claim 1,
    wherein said protrusion has a tapered outer surface that is inclined with respect to an axis of said protrusion,
    and wherein said recess has a tapered inner surface whose taper angle corresponds to that of said tapered outer surface, so that said protrusion and said recess are fitted at the respective tapered outer and inner surfaces.

6. The cutting tool according to claim 1, wherein said first and second pin receiver holes as said pair of coaxial holes are positioned relative to said circumferential wall, such that said pin received in said first and second pin receiver holes has an axially intermediate portion which is located between said first and second pin receiver holes and which is at least partially embedded in said circumferential wall.

7. The cutting tool according to clam 1,
    wherein said protrusion includes an arc-shaped flange portion which projects outwardly in a radial direction of said protrusion,
    and wherein said engaging surface is provided by said arc-shaped flange portion, and has a radially outer end radially distant from an axis of said protrusion by a distance that is substantially half of an inside diameter of said recess.

8. The cutting tool according to claim 1, wherein said one of said cutter head and said holder has, in addition to said pair of coaxial holes, at least one pair of coaxial hole, such that the plurality of pairs of coaxial holes are equally spaced apart from each other in a circumferential direction of said one of said cutter head and said holder.

* * * * *